UNITED STATES PATENT OFFICE.

LADISLAUS GALECKI, PAUL LOPATIN, AND JOHN LOPATIN, OF WARSAW, RUSSIA.

METHOD OF MANUFACTURING BRICKS FROM LIME AND SAND.

SPECIFICATION forming part of Letters Patent No. 662,408, dated November 27, 1900.

Application filed July 7, 1899. Serial No. 723,077. (No specimens.)

*To all whom it may concern:*

Be it known that we, LADISLAUS GALECKI, PAUL LOPATIN, and JOHN LOPATIN, subjects of the Emperor of Russia, and residents of Warsaw, Russia, have invented certain new and useful Improvements in Methods of Manufacturing Bricks from Lime and Sand, of which the following is a specification.

The subject of the present application is a process for the manufacture of exceedingly hard, tough, and weather-resisting lime-and-sand bricks.

The process consists of saponifying coal-tar, asphaltum, or analogous viscous asphaltum-like products with soda and adding this asphaltous mixture to cream of lime. The mixture thus prepared serves to bind the sand to be employed and to convert it into plastic form.

The combining proportions are as follows: to each one and one-half pounds of soda about four liters of coal-tar asphaltum and one hundred and thirty liters of cream of lime, and the combining proportion with the sand is chosen in such a manner that to one hundred parts, by weight, of fine sand a quantity of the binder corresponding to about five to ten parts in weight of slaked lime. From the plastic mixture of sand and binding medium thus produced bricks are manufactured in the usual manner after mixing the whole as uniformly as possible by filling the mixture into molds and exposing it in that condition to a high pressure of about two hundred and fifty atmospheres. After the bricks have been compressed and solidified in this manner they are put on small trucks and left for some time at a temperature of 20° centigrade. Then they are brought into a pressure-chamber, in which they are exposed to the simultaneous action of carbonic acid and superheated dry steam at a pressure of about six atmospheres. The bricks are then dried in a suitable oven at a temperature of 100° centigrade. Thereafter the bricks are immediately ready for use. The chemical actions which are operative in this manufacturing method are probably as hereinafter set forth; but it should be stated in this relation that we make only an attempt at explanation without asserting positively that the actual effect of the process is due to these actions. First the milk of lime acts presumably upon the emulsion of tar-asphaltum and soda solution in such a manner that while the emulsion is maintained the soda is caustified and a small part of the strong excess of lime is converted into carbonate of lime. The active parts of the binding medium might be, therefore, caustic lime, caustic soda, and saponified or emulsified tar constituents, and carbonate of lime. This binder acts upon the sand in such a manner that the lime and the caustic lye of soda affect the sand and form with the same a more or less considerable quantity of lime silicate and soda silicate, probably in part as a double silicate. This process is accelerated by the compression at high pressure, by which the substances are caused to approach to each other as near as possible, and it is finished by the heating with superheated steam, while simultaneously the excess of lime is neutralized by the carbonic acid introduced, this excess of lime being converted into carbonate and being made neutral in the same manner as takes place in the drying of the mortar in the atmosphere which contains carbonic acid. Hence the same process is produced artificially as takes place in nature in the drying of mortar. Moreover, the caustic soda which is present is converted into carbonate, and thus becomes also neutralized. Finally, the carbonic acid presumably converts the silicates formed in the same operation into strongly-acid silicates suitable as binding media. Owing to the high temperature, the tar substance present in the brick as emulsion is distributed uniformly in the whole brick, and thus procures the resisting power against atmospheric influences. Hence the soda performs a triple part. First, it effectuates the emulsion with the asphaltum substance, which would be otherwise impossible; second, it effectuates the formation of caustic lye of soda by the caustic lime, and, third, it thereby favors the attack of the silicic acid in the formation of silicate—that is, it thus serves for the partial conversion of silicates serving as binding media, added in the form of the crystalline silicic acid.

We claim—

The herein-described process of making bricks and the like consisting in mixing together a heavy bituminous substance and soda, adding thereto cream of lime to produce a binder, mixing said binder with sand, and molding and drying the resulting product, substantially as described.

In testimony that we claim the foregoing as our invention we have signed our names in presence of two subscribing witnesses.

LADISLAUS GALECKI.
PAUL LOPATIN.
JOHN LOPATIN.

Witnesses:
JAN BZHKAWSKI,
ADAM MICKIEWICZ.